W. HOPPIE.
RESERVE CELL.
APPLICATION FILED MAR. 9, 1920.

1,432,025.

Patented Oct. 17, 1922.

Inventor
William Hoppie
By his Attorneys
Kerr Page Cooper & Hayward

Patented Oct. 17, 1922.

1,432,025

UNITED STATES PATENT OFFICE.

WILLIAM HOPPIE, OF NEWARK, NEW JERSEY, ASSIGNOR TO NATIONAL CARBON COMPANY, INC., OF NEW YORK, N. Y., A CORPORATION OF NEW YORK.

RESERVE CELL.

Application filed March 9, 1920. Serial No. 364,529.

*To all whom it may concern:*

Be it known that I, WILLIAM HOPPIE, a citizen of the United States, residing at Newark, in the county of Essex and State of New Jersey, have invented certain new and useful Improvements in Reserve Cells, of which the following is a full, clear, and exact description.

The reserve cell which forms the subject matter of the present application is a modification of the cell shown and described and claimed generically in my copending application, Ser. No. 333,937. The present invention relates to a multiple plate type of cell made up of superimposed relatively flat plates which plates are considerably separated from each other when the cell is in inactive condition. Intermediate the plates are disposed the masses of activating material or electrolyte and this material is retained in such a manner that the activating material itself is normally out of contact with the plate electrodes.

The present invention has for its object the provision of a multiple plate cell of this character, in which means is provided for pressing upon one of the plates to thereby cause the superimposed electrodes to approach one another. This movement of approach of the electrodes is adapted to crush the cartons containing the activating material, which material thereafter spreads out laterally between the electrodes and activates the cell.

Other objects of the invention will be set forth in detail in the accompanying specification and shown in the drawings, in which.

Figure 1:
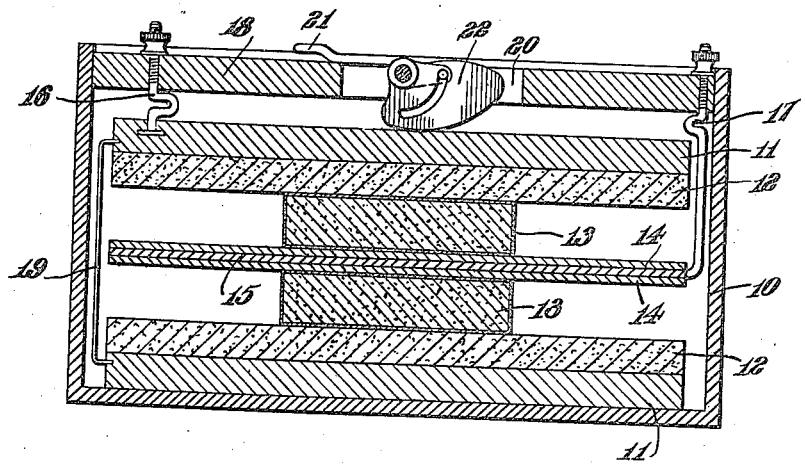
Fig. 1 shows my cell in inactive condition.

The cell comprises a container 10 of fibre, paraffined paper or other suitable material. The container is preferably, but not essentially, rectangular in shape.

At the bottom of the container is placed a positive electrode consisting of a carbon plate 11 having a depolarizing mixture associated therewith as shown at 12. The depolarizer side is up as shown. Above the positive electrode is a carton or container 13 made of waxed paper or paraffin and containing a suitable electrolyte. On top of the carton 13 is a sheet of bibulous paper 14 or a piece of cloth, such as is employed in winding bobbins. On top of the cloth or paper is a sheet of zinc 15 and above this zinc sheet are disposed similar paper sheets 14, cartons 13, and positive electrodes 12–11. While two sets of elements only are shown, it is obvious that they may be duplicated to any desired extent. Suitable flexible lead wires 16 and 17 are provided leading to the positive and negative electrodes. These leads extend outside the top seal 18 of the cell and may be connected to binding posts if desired. A suitable flexible insulating connector 19 connects the two carbon plates 11 together.

The seal is slotted as shown at 20 and provided with a suitable pivot to support an activating lever 21 adapted to cooperate with and actuate an activating cam 22.

Figure 2:
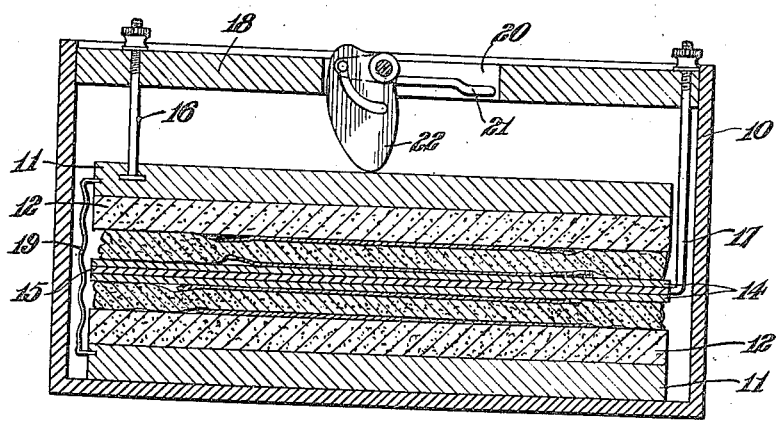
Fig. 2 shows the same cell activated.

Normally when the cell is inactive the cartons 13 have sufficient strength to maintain the plate electrodes apart, but these cartons are of such character that they will be crushed and flattened if extra pressure is applied to the plates. By swinging the activating lever from the position shown in Fig. 1 to that shown in Fig. 2, the activating cam 21 will press downwardly upon the upper electrode 11 and force the entire group of plates closer together. This movement of the plates first crushes the cartons or seals which surround the activating electrolyte and thereafter this electrolyte material is spread out laterally between the plates in contact therewith to activate the cell.

Although the electrodes are shown as plane flat plates, it is obvious that they may be tray shaped or saucer shaped as well, provided they are relatively flat and adapted to nest together.

The advantages of the construction are increased amperage due to the relatively large surface of carbon which is presented to the zinc. The zinc is also so disposed that both sides are available for the generation of energy.

While I have shown the preferred embodiment of my invention it is obvious that varying details of construction may be employed without departing from the scope of the appended claims:

I claim:

1. In a cell, in combination, a container, a plurality of substantially flat electrodes therein, one or more cartons containing activating material adapted to normally hold said electrodes apart and means for pressing said electrodes toward one another to thereby crush the cartons and spread the electrolyte laterally between the flat electrodes and activate the cell.

2. In a cell, in combination, a container, a plurality of substantially flat electrodes therein, one or more cartons containing activating electrolyte material adapted to normally hold said electrodes apart and an activating lever having means associated therewith for pressing said flat electrodes toward one another to thereby crush the cartons and spread the electrolyte between the plates so as to activate the cell.

3. In a cell, in combination, a container, a plurality of substantially flat superimposed electrodes therein, one or more cartons containing activating material disposed between the electrodes and normally holding the same apart, a seal for the container, an activating lever pivoted on said seal and having means associated therewith and extending through the seal adapted to press upon the upper electrode and force the same downwardly, said electrode in its downward movement being adapted to cause the superimposed plates to approach one another and crush the cartons and activate the cell.

4. In a cell, in combination, a plurality of electrodes, cartons containing electrolyte activating material, and an activating lever adapted to swing so as to cause the cartons to be crushed and the electrolyte activating material to be brought into cooperative and active relation with the electrodes to thereby activate the cell.

5. In a cell, a container, a plurality of superimposed electrodes, one or more sealed masses of activating material disposed between said electrodes, and an activating lever adapted to be manipulated to cause a movement of approach of said electrodes, said movement of said electrodes being adapted to cause the seals surrounding said activating material to be crushed and to thereafter spread the activating material laterally between the electrodes.

In testimony whereof I hereunto affix my signature.

WILLIAM HOPPIE.